Oct. 25, 1960
H. H. MUELLER
2,957,367
VARIABLE SPEED DRIVE FOR TURNTABLE OF RECORD PLAYERS
Filed July 25, 1957
2 Sheets-Sheet 1
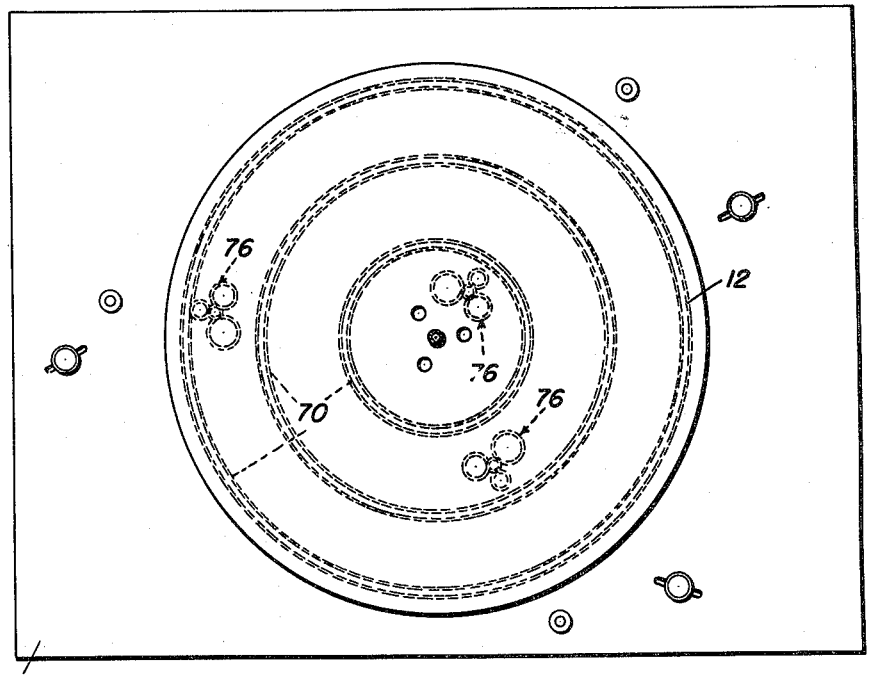
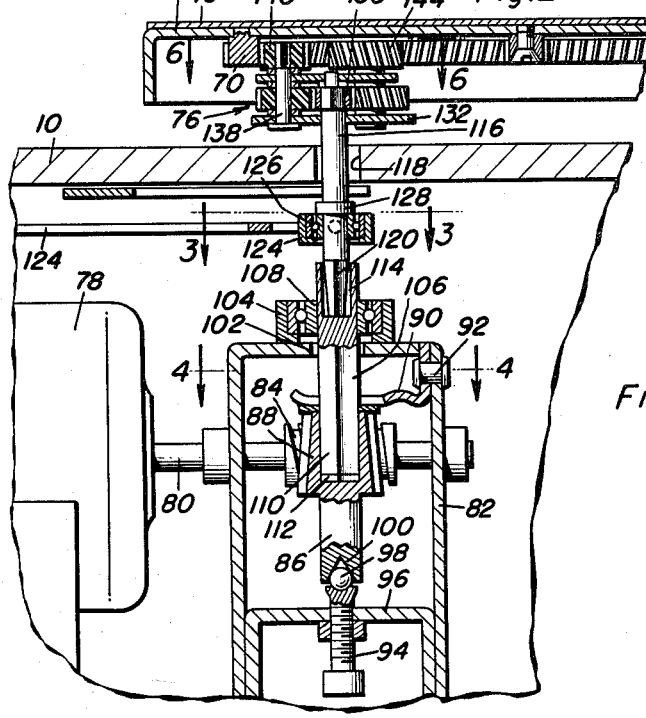
Herman H. Mueller
INVENTOR.

Oct. 25, 1960 H. H. MUELLER 2,957,367
VARIABLE SPEED DRIVE FOR TURNTABLE OF RECORD PLAYERS
Filed July 25, 1957 2 Sheets-Sheet 2
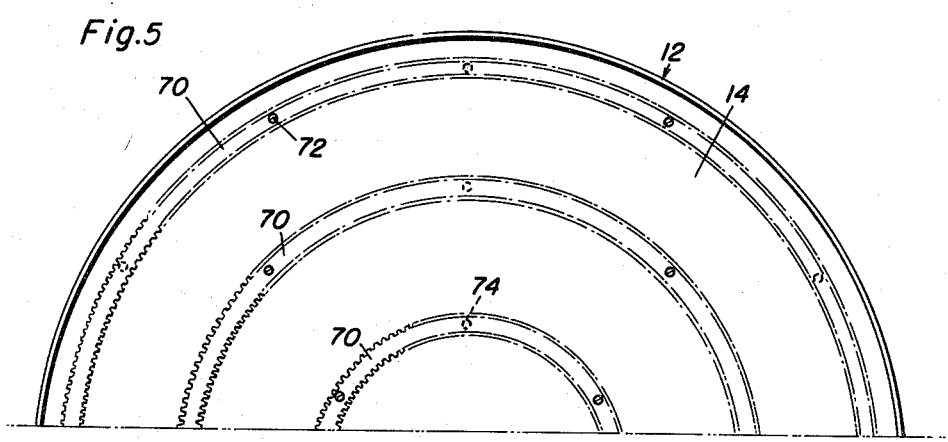
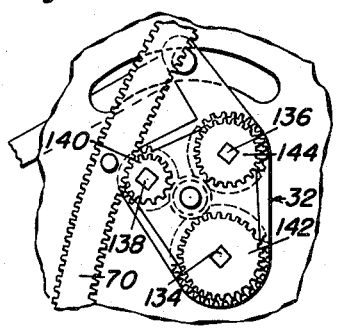
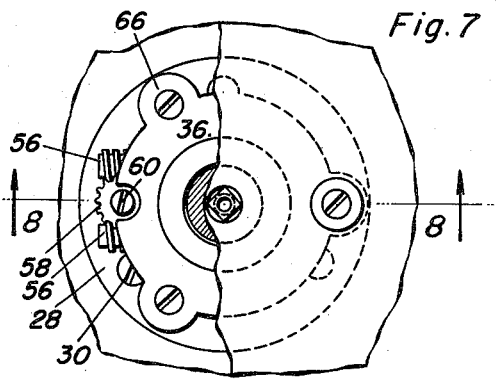
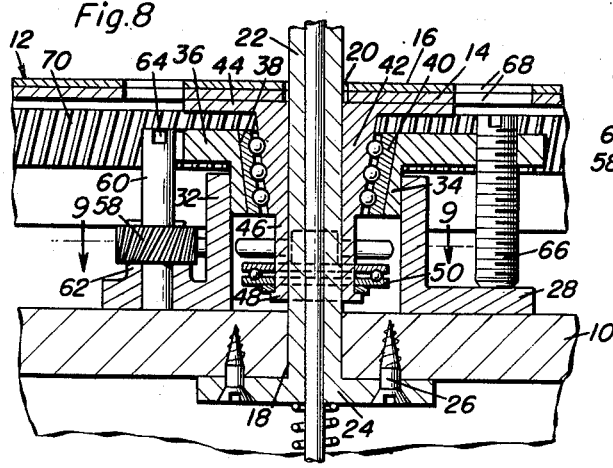
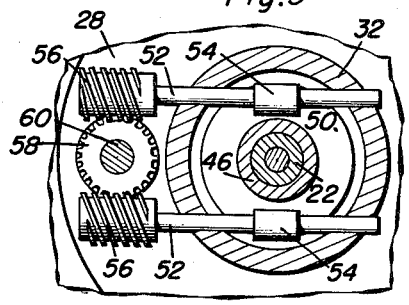
Herman H. Mueller
INVENTOR.
BY Clarence A. O'Brien
and Harvey B. Jacobson
Attorneys United States Patent Office 2,957,367
Patented Oct. 25, 1960

2,957,367

VARIABLE SPEED DRIVE FOR TURNTABLE OF RECORD PLAYERS

Herman H. Mueller, 123 W. King St., Ephrata, Pa.; Elizabeth M. Mentzer, executrix of the will of Herman H. Mueller, deceased Filed July 25, 1957, Ser. No. 674,117

13 Claims. (Cl. 74—665)

The primary purpose of this invention is to provide a turntable construction having a greatly improved variable speed driving means therefor together with an improved means for mounting the turntable and for taking up wear in both the mounting means and in the turntable drive means.

A further object of the invention is to provide a turntable drive construction which will permit the application of a plurality of separate driving means to the turntable, each of which shall be capable of driving the turntable at a plurality of speeds from a single source of power.

Yet another object of the invention is to provide a turntable drive means in accordance with the preceding object which will permit a large number of replaceable ring gears of different size and having different gear ratios to be detachably mounted upon the underside of a turntable for engagement by a turntable driving mechanism.

A further important object of the invention is to provide a positive, non-slipping, non-frictional driving mechanism for a turntable which shall secure the advantages of a positive geared drive for the turntable and yet which will provide therein means for effectively compensating for wear on the gearing of the drive means.

An additional object of the invention is to provide in a gearing assembly for driving a turntable with a positive, non-slipping drive, means for taking up wear or lash developing in the connection of the driving means to a source of power; and further means for taking up wear in the engagement of the speed change gearing assembly with a driving gear ring on the turntable.

Another important object of the invention is to provide an improved mounting for journalling and supporting a turntable and which will permit wear in the supporting means to be readily adjusted and compensated for.

A further object of the invention is to provide a turntable mounting construction as set forth in the foregoing objects wherein the adjustment of the turntable mounting means can be readily effected through apertures in the turntable itself.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of a phonograph record player having a turntable, and showing in dotted lines the arrangement of a plurality of driving ring gears secured to the underside of the turntable and a speed changing gearing assembly associated with each of these driving gears and with a separate source of power whereby a plurality of speeds of rotation may be selectively imparted to the turntable;

Figure 2 is a fragmentary detail view in vertical transverse section upon an enlarged scale and showing the construction and manner in which a single driving motor is operatively geared to one of the plurality of driving ring gears secured to the underside of a turntable for driving the latter at adjustably variable speeds;

Figure 3 is a horizontal sectional detail view taken substantially upon the plane indicated by the section line 3—3 of Figure 2 and showing the means by which wear in the engagement of the speed change gearing assembly and one of the driving ring gears of a turntable may be compensated for by the invention;

Figure 4 is a horizontal sectional detail view taken substantially upon the plane indicated by the section line 4—4 of Figure 2 and showing a means for resiliently opposing movement of one gear member of a gearing connection relative to the other member thereof;

Figure 5 is a fragmentary bottom plan view of the turntable showing a plurality of ring gears mounted thereon;

Figure 6 is a horizontal sectional view taken substantially upon the plane indicated by the section line 6—6 of Figure 2 and showing the speed changer mechanism employed in this invention;

Figure 7 is a fragmentary view in plan, parts being broken away, and showing a part of the means for adjusting the wear in the turntable mounting;

Figure 8 is a vertical transverse sectional view taken substantially upon the plane indicated by the section line 8—8 of Figure 7 and upon an enlarged scale, and showing further details of the turntable mounting means and the wear take-up therefor; and Figure 9 is a horizontal sectional detail view taken substantially upon the plane indicated by the section 9—9 of Figure 8 and showing in greater detail the manually adjustable means for taking up wear in the mounting for the turntable.

The present invention is similar in subject matter to that of my prior copending application Serial No. 296,382, filed June 30, 1952, now matured into Patent No. 2,809,-843 of October 15, 1957, and is an improvement thereon.

The fundamental aim of the present invention is to provide a driving means and a mounting means for a turntable which will enable the latter to be driven selectively at a plurality of different speeds, and yet will provide an advantageous means for compensating for or adjusting for wear in the driving means and in the mounting means of the turntable.

In the accompanying drawings, reference is made first to Figures 1, 2 and 3 in which is shown a portion of a phonograph record player which may be of any suitable type, and which includes a cabinet having a top wall 10 together with a turntable 12 rotatably journaled thereon. Conveniently this turntable may consist of a steel circular disk or plate 14 which may have a felt or other cover 16 upon its top surface upon which is supported a record to be rotated and played by the apparatus in a known manner. Although any suitable type of turntable surface 16 may be employed, the present invention is especially adapted in its effectiveness for use with the interlocking type of turntable disclosed and claimed in my prior copending applications Serial Nos. 314,987, now Patent No. 2,837,337; 476,732, now Patent No. 2,900,192; 347,507; and others which have now matured into Patents Nos. 2,809,843; 2,841,400; 2,809,840 but inasmuch as the improved and novel features claimed hereinafter are not limited to such construction, illustration of the same is deemed to be unnecessary in the drawings and disclosure of this application.

Referring now specifically to Figure 8 it will be observed that the cabinet top wall 10 is apertured as at 18 while the turntable 12 is similarly apertured as at 20. A stationary spindle 22 in the form of a tube or sleeve extends through these apertures and at its lower end is provided with a laterally extending flange 24 secured to the underside of the top wall 10 as by screws 26.

The stationary spindle 22 is adapted to receive thereon the usual spindle aperture of the record to be played by the turntable and the other elements of this apparatus, not shown.

Referring first to Figures 7–9, it will be seen that there is provided a novel, highly effective and adjustable mounting and journalling construction for the turntable.

For this purpose there is secured in any suitable manner to the top surface of the cabinet top wall 10, as by a mounting flange 28, together with fastening screws 30 an upwardly vertically projecting cylindrical guide sleeve 32 which is open at its upper end. Slidably received in the open upper end of the guide sleeve 32 is the depending circular sleeve 34 of a carriage 36. The carriage is provided with an axially disposed internal conical bore 38 comprising an outer bearing race which receives therein a thrust bearing assembly 40, the latter supporting a complementary conical inner bearing race 42 having at its upper end a laterally projecting mounting flange 44 which is secured in any desired manner to the undersurface of the turntable in fixed relation thereto.

As shown in Figure 8 the conical inner bearing race 42 terminates at its lower end in a depending diametrically reduced neck portion 46 provided at its lower end with a radially projecting rib or flange 48 upon which is seated a thust bearing assembly 50.

Referring next to Figure 9 it will be seen that a pair of parallel horizontally disposed adjusting shafts 52 are journaled in aligned apertures through the walls of the guide sleeve 32, and intermediate their ends are provided with eccentrics or cams 54 thereon which are operatively disposed above and in contact with the bearing assembly 50. At their outer ends the adjusting shafts 52 are provided with helical or work gears 56 which mesh with an adjusting gear 58 carried by a shaft 60. The shaft 60 in turn is journaled at its lower end in a journalling boss 62 which may constitute a part of the vertical guide sleeve 32 and at its upper end is provided with a kerf or notch 64.

Referring again to Figures 7 and 8 it will be seen that the supporting flange 36 of the sleeve 34 has adjusting screws 66 threadedly engaged therethrough and extending beneath the same for abutting engagement with the top of the mounting flange 28 of the guide sleeve 32. The turntable 12 is provided with suitably aligned bores or apertures therethrough as at 68 which are so disposed that access may be had through the same to engage the adjusting screw 66 or to obtain access to the notch or kerf 64 in the upper end of the adjusting screw shaft 60.

As now described it will be apparent that the turntable is rotatably supported by the thrust bearing assembly 40 upon the carriage sleeve 34, and that the abutting engagement of the screw 66 with the flange 28 serves to vertically adjust the height of this supporting carriage with respect to the top wall 10 of the cabinet, to thereby raise or lower the turntable relative thereto. However, adjustment of the vertical shaft 60 through the openings in the turntable 68, serves to rotate the gear 58 and through this gear to rotate the two adjusting shafts 52. The eccentrics or cams 54 thereon, abutting the top surface of the thrust bearing 50, will serve to apply pressure urging the carriage downwardly and thus enable the desired pressure or take-up for wear to be effected upon the thrust bearing assembly 40. The screw 66 will then serve to lock the adjustment of the thrust bearing in the desired degree of adjustment.

It should be noted that access is had to this adjustment and locking means for the adjustment of the turntable thrust bearing through the turntable itself by means of the aperture 68.

Referring now particularly to Figures 1 and 6 it will be seen that the underside of the turntable 12 has removably and selectively secured thereto a plurality of ring gears each designated by the numeral 70, there being illustrated concentric outer, inner and intermediate ring gears. Each of these ring gears is provided upon both its cylindrical inner and outer periphery with teeth adapted to be driven by a driving mechanism as set forth hereinafter. The ring gears are removably secured to the underside of the turntable as by countersunk screws 72 therein together with a plurality of positioning dowel pins 74. While any desired number of the countersunk screws and recessed dowel pins may be provided, six to eight screws and three or four dowel pins are found to be highly satisfactory. Further, although three ring gears are illustrated, it is to be understood that any desired number of ring gears may be employed as desired. These gears being displaced different radial distances from the center of rotation of the turntable enable various selected speed ratios to be employed for driving the turntable, thus providing a wide variety and range of speeds for the turntable. Operatively engaged with each of the ring gears is a speed change mechanism connected by a driving gear assembly designated generally by the numeral 76, the speed changer 76 in turn being operatively connected with a source of power such as an electric motor 78. It should be understood that one such motor is provided for each of the ring gears, whereby the motor and ring gear will cooperate to drive the turntable at a particular or selected speed. The speed change gearing assembly 76 in turn will afford three or more speeds of rotation for each electric motor and ring gear associated therewith as set forth hereinafter.

It is within the purview of this invention to provide the bottom surface of the turntable with a plurality of appropriately spaced sets of bores to receive the dowel pins 74, the fastening screws 72, in order that various sizes of ring gears may be selectively applied to the turntable to thereby provide selected various speeds of rotation for the turntable.

Referring now to Figures 2–4 for a description of the driving connection between the electric motor 78 and the speed reduction gearing assembly 76, it will be seen that each of the electric motors is provided with an armature or power take-off shaft 80 which extends through and is journaled in a supporting bracket 82, within which the shaft is provided with a fixedly secured helical or worm gear 84 comprising the drive gear of the gear train. Received within the bracket or housing 82 is a vertical drive shaft 86 having a driven gear or pinion 88 thereon which meshes with the drive gear 84. A resilient forked finger 90 is secured to the bracket or housing 82 and rests upon the top of the driven bevel or tapered gear 88 for yieldingly urging the latter and its shaft 86 downwardly or in a direction to introduce lash or play between the meshing engagement of the gears 88 and 84. The resilient fork is secured as by a fastener 92 to the bracket at one side thereof, and the resilient forked finger therefore yieldingly urges the shaft 86 downwardly. An adjusting screw 94, threadedly engaged through a mounting bracket 96 is provided at its upper end with a ball bearing 98 engaging a bearing seat 100 in the lower end of the shaft 86 and provides means for urging the shaft upwardly against the resistance of the spring means 90, thereby urging the gear 88 into tighter engagement with the driving gear 84 and thus take up or adjust the lash between these two gears.

As will be noted from Figure 2, the upper portion of the bracket 82 is provided in the top wall with an aperture 102 therethrough and a bearing retaining sleeve 104 surrounds this aperture. A shaft extension 106 is journaled in the retainer 104 as by a bearing 108 and has its squared lower end 110 received in a correspondingly shaped socket 112 in the upper end of the shaft 86 for driving engagement therewith. As will be observed, the shaft extension 106 extends up through the aperture 102 and above the bearing 108, its upper end being provided with a socket 114.

The speed change gearing assembly 76 is supported by and is driven by the vertical shaft 116 which extends through the bore or opening 118 in the top wall 10 of the cabinet and has its lower end tapered and non-circular in cross-section as shown at 120 for a loose fit in the socket 114. The tapered lower end 120 thus allows a non-slipping driving connection between the shaft extension 106 and the shaft 116, but permits limited lateral movement or tilting of the shaft 116 in the upper end of the shaft extension for a purpose to be subsequently apparent. A yoke 122 carried by a manual adjusting arm 124 is provided with a bearing assembly 126 which embraces the shaft 116 below an annular collar or rib 128 thereon. This yoke provides means whereby the shaft 106 may be manually tilted by lateral displacement.

Referring next to Figure 6 in conjunction with Figure 2 it will be seen that the upper end of the shaft 116 has a driving gear 130 fixedly secured thereto. Supported by a suitable carriage or frame 132 which is rotatably mounted upon and carried by the upper end of the shaft 116, are a plurality of driven gears, each meshing with the driving gear 130, and fixedly secured to the vertical axles or shafts 134, 136, and 138. At their upper ends these shafts carry the gears 140, 142 and 144 respectively, which may be selectively placed into driving contact with the associated ring gear 70 by merely rocking the supporting carriage or framework 132 about the axis of the shaft 116 by any suitable means (not shown). It will thus be seen that the sets of gears carried by the axles 134, 136 and 138 when selectively placed in engagement with the ring gear 70 provide three separate gear ratios between the shaft 116 and that ring gear for operating the turntable from its associated electric motor 78. Thus, with the three electric motors shown, there are possible nine different speeds of rotation for the turntable, all compactly arranged.

As wear develops between the gears 140, 142 and 144 and the ring gear 70, such wear may be taken up by manipulating the manual adjusting lever 124 to thereby press the speed change gearing assembly 76 more tightly against the ring gear and thus take up wear therein.

From the foregoing it will be apparent that a variable speed drive has been provided for the turntable affording a large variety of speeds whereby the turntable may be assembled by the manufacturer to give any desired combination of speeds of rotation. The three internal and external ring gears 70, in conjunction with the three speed drives for each provide a possible eighteen different speeds of rotation for the turntable in the device illustrated. Moreover, at all speeds of rotation, the turntable is driven by a non-slippery, non-frictional positive geared drive, thereby insuring the exact speed of rotation desired and contributing towards perfect tonal reproduction of a record.

In addition, wear in the gearing driving the turntable may be effectively and completely taken up by the aforementioned adjusting means therefor. Similarly, wear in the bearings journalling and supporting the turntable may likewise be taken up. Moreover, it is contemplated that the various gearings employed throughout this invention shall employ non-metals such as laminated, fiber or other construction in order to avoid the noise of a metal to metal driving contact. Thus, any or all of the gears shown herein may be of non-metallic material.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A turntable construction for phonograph record players comprising a turntable, means fixedly supporting said turntable against lateral movement in a horizontal plane for rotation about a vertical axis, a positive non-slipping and non-frictional driving means for causing rotation of said turntable at various selected speeds, said driving means including a plurality of ring gears mounted upon said turntable, a motor for driving each ring gear, a change speed mechanism engageable with each ring gear, a gearing assembly connecting each motor to a change speed mechanism, said change speed mechanism being driven by and supported upon a first shaft, a second shaft telescopingly engaging said first shaft, a swiveling connection between said first and second shafts, means for tilting said first shaft whereby to adjust lash between said change speed mechanism and said ring gear.

2. A turntable construction for phonograph record players comprising a turntable, means fixedly supporting said turntable against lateral movement in a horizontal plane for rotation about a vertical axis, a positive non-slipping and non-frictional driving means for causing rotation of said turntable at various selected speeds, said driving means including a plurality of ring gears mounted upon said turntable, a motor for driving each ring gear, a change speed mechanism engageable with each ring gear, a gearing assembly connecting each motor to a change speed mechanism, said gearing assembly including a worm gear secured to the armature of said motor, a driven gear meshing with said worm gear, means mounting said driving gear for movement towards and from said worm gear, resilient means urging said driven gear away from said worm gear, adjusting means urging said driven gear towards said worm for taking up lash therebetween.

3. A turntable construction for non-slipping phonograph record players comprising a turntable, means fixedly supporting said turntable against lateral movement in a horizontal plane for rotation about a vertical axis, a positive non-slipping and non-frictional driving means for causing rotation of said turntable at various selected speeds, a vertical cylindrical guide, a carriage secured to said turntable and operatively associated with said guide for vertical movement thereon, thrust bearing means operatively interposed between said carriage and said turntable, means carried by said guide and turntable for taking up wear in said thrust bearing means, said turntable including an inner race for said thrust bearing means, said inner race having a cylindrical depending extension in said guide, said wear take-up means including a shaft journaled in said guide, a cam on said shaft engaging said extension for tightening said thrust bearing means.

4. The combination of claim 3 including a gear on said shaft, an adjusting means having a second gear engaging said first mentioned gear.

5. The combination of claim 4 including an opening in said turntable adapted to register with and afford access to said adjusting means.

6. A turntable construction for phonograph record players comprising a turntable, means fixedly supporting said turntable against lateral movement in a horizontal plane for rotation about a vertical axis, a positive non-slipping and non-frictional driving means for causing rotation of said turntable at various selected speeds, said driving means including a plurality of ring gears mounted upon said turntable, a motor for driving each ring gear, a change speed mechanism engageable with each ring gear, a gearing assembly connecting each motor to a change speed mechanism, said gearing assembly including a worm gear secured to the armature of said motor, a driven gear meshing with said worm gear, means mounting said driving gear for movement towards and from said worm gear, resilient means urging said driven gear away from said worm gear, adjusting means urging said driven gear towards said worm for taking up lash therebetween, said gears including non-metal gears whereby to avoid metal to metal contact.

7. A turntable construction for phonograph record players comprising a turntable, means fixedly supporting said turntable against lateral movement in a horizontal plane for rotation about a vertical axis, a positive non-slipping and non-frictional driving means for causing rotation of said turntable at various selected speeds, said driving means including a plurality of ring gears mounted upon said turntable, a motor for driving each ring gear, a change speed mechanism engageable with each ring gear, a gearing assembly connecting each motor to a change speed mechanism, said gearing assembly including a worm gear secured to the armature of said motor, a driven gear meshing with said worm gear, means mounting said driving gear for movement towards and from said worm gear, resilient means urging said driven gear away from said worm gear, adjusting means urging said driven gear towards said worm for taking up lash therebetween, said driven gear comprising a helical gear of non-metallic material.

8. A turntable construction for phonograph record players comprising a turntable, means supporting said turntable for rotation about a vertical axis, driving means having a positive drive connection to said turntable for driving it at various selected speeds, said supporting means comprising a mounting flange having an upstanding guide sleeve, a carriage having a depending circular sleeve slidably and guidably received in said guide sleeve, said turntable being rotatably supported on said carriage, adjusting means mounted on said carriage and engaging said mounting flange for vertically adjusting said turntable relative to said mounting flange.

9. The combination of claim 8 including a member fixedly secured to the underside of the turntable and rotatably journaled in and extending through the carriage, a thrust assembly secured to said member beneath the carriage and within said guide sleeve, wear take-up means connected to said thrust assembly and operable to move the member relative to said carriage for taking up bearing wear therebetween.

10. The combination of claim 9 wherein said wear take-up means includes an adjusting shaft rotatably journaled in and extending transversely through said guide sleeve, cam means on said shaft engaging said thrust assembly.

11. The combination of claim 10 including adjusting apertures in said turntable, an adjusting screw connected to said adjusting shaft for rotating the latter and positioned for registration with said apertures.

12. A turntable construction for phonograph record players comprising a turntable, means supporting said turntable for rotation about a vertical axis, driving means having a positive drive connection to said turntable for driving it at various selected speeds, said driving means including a motor, a ring gear on said turntable remote from the rim thereof, gearing connecting said motor to said ring gear, said gearing including a driving gear connected to said motor and a driven gear meshing therewith, a shaft fixedly connected to said driven gear, resilient means urging said driven gear away from said driving gear for increasing lash therebetween, means engaging said shaft and opposing said resilient means for adjustably urging the driven gear towards the driving gear to reduce and adjust lash therebetween.

13. The combination of claim 12 including a second shaft connected to the first mentioned shaft for limited lateral tilting, said second shaft being connected to said turntable, means for effecting lateral tilting of said second shaft to take-up wear between the latter and the turntable.

References Cited in the file of this patent
UNITED STATES PATENTS

| | | |
|---|---|---|
| 1,067,144 | Schilling | July 8, 1913 |
| 1,448,189 | Brunner | Mar. 13, 1923 |
| 1,788,445 | Weinbrenner | Jan. 13, 1931 |
| 1,951,875 | Laabe | Mar. 20, 1934 |
| 2,029,094 | De Vlieg et al. | Jan. 28, 1936 |
| 2,097,071 | Lichten | Oct. 26, 1937 |
| 2,114,911 | Burt | Apr. 19, 1938 |
| 2,184,032 | Allen | Dec. 19, 1939 |
| 2,203,292 | Best | June 4, 1940 |